United States Patent [19]

Doorakian et al.

[11] 4,438,254

[45] Mar. 20, 1984

[54] PROCESS FOR PRODUCING EPOXY RESINS

[75] Inventors: George A. Doorakian, Bedford; Marsha A. Paul, Natick, both of Mass.

[73] Assignee: The Dow Chemical Company, Midland, Mich.

[21] Appl. No.: 470,107

[22] Filed: Feb. 28, 1983

[51] Int. Cl.³ .................... C08G 59/62; C08G 59/68
[52] U.S. Cl. .................................. 528/89; 528/104; 528/99; 528/109
[58] Field of Search ................ 528/89, 109, 104, 99

[56] References Cited

U.S. PATENT DOCUMENTS

| | | | |
|---|---|---|---|
| 3,477,990 | 11/1969 | Dante et al. | 528/91 X |
| 3,547,881 | 12/1970 | Mueller et al. | 528/89 |
| 3,547,885 | 12/1970 | Dante et al. | 528/97 X |
| 3,694,407 | 9/1972 | Krikorian | 528/89 X |
| 3,738,862 | 6/1973 | Klarquist et al. | 528/92 X |
| 3,948,855 | 4/1976 | Perry | 528/98 X |
| 4,048,141 | 9/1977 | Doorakian et al. | 528/89 |
| 4,171,420 | 10/1979 | Doorakian et al. | 528/89 |
| 4,352,918 | 10/1982 | Whiteside et al. | 528/89 |
| 4,389,520 | 6/1983 | Gannon | 528/89 |

*Primary Examiner*—Earl A. Nielsen

[57] ABSTRACT

An improved process for reacting vicinal epoxides with phenols or thiophenols is described. This process is conducted at essentially anhydrous conditions and temperatures less than 175° C. The resulting resins are generally more linear and less colored than advanced resins produced via prior art processes. Also the phosphonium catalyst remains active to promote subsequent advancement or curing reactions. The catalyst can be deactivated in a separate step to produce a resin of exceptional purity.

20 Claims, No Drawings

PROCESS FOR PRODUCING EPOXY RESINS

BACKGROUND OF THE INVENTION

This invention relates to an improved process for maintaining the activity of phosphonium catalysts during the advancement reaction of an epoxy resin with a polyhydric phenol or thiophenol.

Epoxy resins have long been produced by the reaction of a vicinal epoxide with a compound bearing phenolic hydroxyls in the presence of a catalyst in a so-called advancement reaction. A variety of ctalysts have been reported in the art, including tertiary amines, quaternary ammonium halides, phosphonium halides, phosphonium carboxylates and the like. Processes for using these catalysts, as well as stoichiometric reagents, have been detailed in U.S. Pat. Nos. 2,216,099; 2,633,458; 2,658,855; 3,377,406; 3,477,990; 3,547,881; 3,547,885; 3,569,374; 3,694,407; 3,738,862; 3,948,855; 4,048,141 and 4,177,216. Canadian Pat. No. 893,191, German Pat. DT Nos. 2,206,218 and 2,335,199, the texts *Handbook of Epoxy Resins* by H. Lee and K. Neville, McGraw-Hill (1967) and *Epoxy Resins Chemistry and Technology*, edited by C. A. May and Y. Tanaka, Marcel Decker, Inc. (1973) are also of interest.

Tetrahydrocarbyl phosphonium halide, carboxylate, phenate and bisphenate salts have earned favor as catalysts for producing epoxy resins by the reaction of diglycidyl ethers of polyhydric phenols and epihalohydrins. The resulting epoxy resins are generally relatively linear and low in color, when resins having moderate (less than about 30,000) weight average molecular weights are prepared. However, it has now been found that the phosphonium salt, depending on the identity of the salt, is more or less rapidly deactivated as the advancement of the epoxy resin progresses in advancement reactions known in the art. Accordingly, greater quantities of the phosphonium salt than would otherwise be necessary must be employed. Moreover, catalyst deactivation may proceed via reaction with vicinal epoxide end groups, resulting in a resin product having an epoxide content significantly lower than the theoretical value.

It would therefore be advantageous to develop a method of preventing deactivation of the tetrahydrocarbyl phosphonium salt during the epoxy advancement reaction. Also it would be desirable to produce resins in which the advancement catalyst is deactivated without reacting with the epoxy resin product. The subject invention affords these and other advantages.

SUMMARY OF THE INVENTION

It has now been discovered that a tetrahydrocarbyl phosphonium salt catalyst is not substantially deactivated during the advancement reaction of (a) a compound bearing an average of more than one vicinal epoxide group per molecule with (b) a polyhydric phenol or thiophenol, when the reaction is conducted under certain novel conditions. These novel conditions are that the reaction and exotherm temperature is less than about 175° C. and the reaction medium is essentially anhydrous. By the term "essentially anhydrous" is meant that the reaction medium is absolutely free of water or contains a sufficiently small quantity of water so that at least 75 mole percent of the phosphonium catalyst retains its activity after 120 minutes at 160° C. in the advancement reaction medium. Although the anion of the phosphonium catalyst may be exchanged during this reaction, it is advantageous that at least about 50 percent of the phosphonium cation initially introduced is still present in this form at the completion of the advancement reaction.

The advanced epoxy resin essentially free of decomposition products of the phosphonium catalyst is believed to be a novel composition of matter. This novel advanced epoxy resin is generally less colored and has an epoxy equivalent weight closer to the theoretical value than prior art resins produced in the conventional manner using phosphonium salts as catalysts. These products are generally more linear and less colored than advanced epoxy resins prepared using quaternary ammonium catalysts or stoichiometric reagents. Moreover, the active catalyst still present can be useful in subsequent advancement of the epoxy resin or subsequent curing with anhydrides or amines. Thus, a precatalyzed, partially-advanced epoxy resin can be prepared in this manner.

It has been observed that the deactivation products of the phosphonium catalysts are tertiary phosphine oxides, which do not exhibit substantial catalytic activity in advancement or other reactions of epoxy resins. At the conditions conventionally employed in the advancement of epoxy resins, it is believed the deactivation of the phosphonium catalyst can occur by either reaction with terminal epoxide groups of the resin product or reaction with water present. Either the phosphonium cation or a transient phosphonium ylid derived therefrom may be subject to deactivation by the aforementioned routes. Dependent on the catalyst the tertiary phosphine oxide product from these two deactivation routes may be the same or different. The catalyst appears to be particularly susceptable to deactivation after most (greater than 95 percent) of the phenolic hydroxyl groups present have been reacted. Accordingly, a relatively large quantity of catalyst may be required in prior art processes to prepare high molecular weight resins.

It has been found that if a stoichiometric quantity of a compound which reacts rapidly and selectively with a phosphonium ylid is introduced to the advanced epoxy resin reaction product containing the still active phosphonium catalyst, the catalyst can be deactivated with essentially no deleterious reaction of the catalyst or its by-products with the vicinal epoxide moieties. The resulting non-catalytic advanced epoxy resin composition is believed novel.

DETAILED DESCRIPTION OF THE INVENTION

Phosphonium Catalysts:

The tetrahydrocarbyl phosphonium salts of protic acids used herein as catalysts are well-known in the art. These salts correspond to the formulae I, II or III

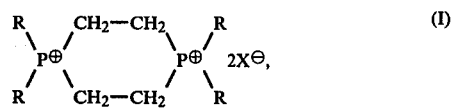

(I)

(II)

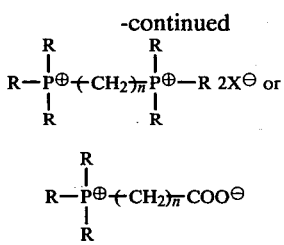

(III)

(IV)

wherein R at each occurrence is independently a hydrocarbyl group or substituted hydrocarbyl group, n is an integer from 1 to 20 and X is a compatible anion. The compatible anion, X, can be any anion used in the prior art for such catalysts. Preferred as anions are halides, i.e., Br, Cl or I; carboxylates, such as formate, acetate, oxalate or trifluoroacetate; conjugate bases of weak inorganic acids, such as bicarbonate, tetrafluoroborate or biphosphate and conjugate bases of a phenol, such as phenate or an anion derived from bisphenol A. In some instances the tetrahydrocarbyl phosphonium salts are complexed with the protic acid from which the anion of the phosphonium salt is derived. The phosphonium salt can also be a zwitterion of formula IV, e.g., $R_3-P^{\oplus}-CH_2CO_2^{\ominus}$ and other phosphonium hydroxide inner salts described in U.S. Pat. No. 4,048,141.

The R groups borne by the phosphonium cations can be aliphatic or aromatic in character. Preferably each phosphonium cation bears at least one R group which is aromatic in character, more preferably at least two such aromatic groups. At higher catalyst concentrations, e.g., greater than 0.3 percent by weight of the reactants, the phosphonium salt bearing at least one aryl group will produce a resin product which is less colored than one prepared using a tetraalkylphosphonium salt having the same anion. These aromatic groups preferably are phenyl, benzyl or $$-\!\!\bigcirc\!\!-OR^1,$$

wherein $R^1$ is hydrogen or $$-CH_2\overset{O}{\overset{\diagup\!\!\diagdown}{C\ H}}CH_2.$$

Most preferably, two R groups on each phosphonium cation of Compound III and three R groups on each phosphonium cation of Compound II is phenyl. The compounds corresponding to formula II are preferred.

Those R groups which are not aromatic are preferably $C_1-C_{20}$ alkyl, more preferably n-alkyl. Preferably, one R group is alkyl. The most preferred alkyl groups have from 1 to 4 carbon atoms, with methyl being especially preferred.

The tetrahydrocarbyl phosphonium salts used herein are generally available commercially or can be prepared by methods known in the prior art. Methods for the preparation of these phosphonium salts are described in U.S. Pat. Nos. 3,477,990; 4,302,574; 4,048,141 and 4,266,079, as well as Kosolapoff et al, *Organic Phosphorus Compounds*, Vols. 1 and 2, Wiley-Interscience (1972), the relevant portions of which are incorporated herein by reference.

The phosphonium salts as produced or obtained commercially generally will contain small quantities (up to 4 weight percent) of water. In accordance with this invention it has been found that this residual water can have a deleterious effect on the epoxy resin product. Accordingly, it is desirable to render the catalyst as anhydrous as possible by conventional techniques, e.g., distillation or dehydrating agent, prior to introduction into the advancement reaction medium. Alternatively, the water associated with the catalyst can be eliminated after the catalyst has been added to the reaction medium as described hereafter.

Epoxy Reactants:

The most useful epoxy reactants in this process are the polyepoxides, particularly epoxy resins. These polyepoxides are reacted with polyhydric phenols (compounds having more than one phenolic hydroxy group) to form a phenolic hydroxy ether in the so-called advancement reaction. The polyepoxide reactants are organic compounds possessing more than one 1,2-epoxide group per molecule. These polyepoxides can be saturated or unsaturated aliphatic or cycloaliphatic, aromatic or heterocyclic in nature. Additionally, the polyepoxides can bear substituents which are inert in the advancement reaction, such as ether or halogen moieties.

The polyepoxides are conveniently described in terms of epoxy equivalent values, as defined in U.S. Pat. No. 2,633,458. The polyepoxides used in the subject advancement reaction are those having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other examples of polyepoxides include the glycidyl ethers of novolac resins, i.e., phenol-aldehyde condensates. Preferred resins of this type are those of the formula:

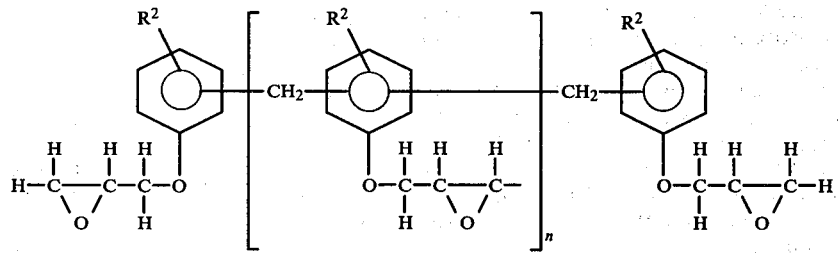

wherein each $R^2$ independently is hydrogen or an alkyl radical and n has an average value of from about 0.1 to about 10, preferably from about 1 to about 2. Preparation of these polyepoxides is illustrated in U.S. Pat. Nos. 2,616,099 and 2,658,885.

The preferred polyepoxides are those represented by the general formula

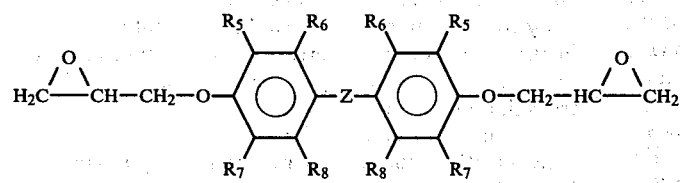

XI wherein $R_5$, $R_6$, $R_7$ and $R_8$ are each independently selected from hydrogen, bromine and chlorine and wherein Z is selected from oxygen, sulfur, —SO—, —SO$_2$—, bivalent hydrocarbon radicals containing up to about 10 carbon atoms, oxygen-, sulfur- and nitrogen-containing hydrocarbon radicals, such as —OR'O—, —OR'—O—R'—O—, —S—R'—S—, and $$-\overset{O}{\underset{\parallel}{C}}-O-,$$

wherein R' is a bivalent hydrocarbon radical at each occurrence. "Z" preferably is an alkylene or alkylidine group having from about 1 to about 4 carbon atoms.

Other examples of polyepoxides include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecanedioate, butyl 9,12,15-octadecanetrioate, butyl oleostearate, mono- or diglycerides of tung oil, monoglycerides of soybean oil, sunflower oil, rapeseed oil, hempseed oil, sardine oil, cottonseed oil, and the like.

Another group of the epoxy-containing materials used in the process of the invention include the epoxidized esters of unsaturated monohydric alcohols and polycarboxylic acids, such as, for example, diglycidyl phthalate, diglycidyl adipate, diglycidyl isophthalate, di(2,3-epoxybutyl)adipate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl)diphenyldicarboxylate, di(3,4-epoxyheptyl)sulfonyldibutyrate, tri(2,3-epoxybutyl)1,2,4-butanetricarboxylate, di(5,6-epoxypentadecyl)tartrate, di(4,5-epoxytetradecyl)maleate, di(2,3-epoxybutyl)azelate, di(3,4-epoxybutyl)citrate, di(5,6-epoxyoctyl)cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxyhexyl 3,4-epoxypentanoate; 3,4-epoxy-6-methylcyclohexylmethyl 3,4-epoxy-6-methylcyclohexane carboxylate.

Still another group of the epoxy-containing materials includes epoxidized derivatives of polyethylenically unsaturated polycarboxylic acids, such as, for example, dimethyl 8,9,12,13-diepoxyeicosanedioate; dibutyl 7,8,11,12-diepoxyoctadecanedioate; dioctyl 10,11-diethyl-8,9,12,13-diepoxyeicosanedioate; dihexyl 6,7,10,11-diepoxyhexadecanedioate; didecyl 9-epoxyethyl-10,11-epoxyoctadecanedioate; dibutyl 3-butyl-3,4,5,6-diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyethylenically unsaturated hydrocarbons, such as epoxidized 2,2-bis(2-cyclohexenyl)propane, epoxidized vinyl cyclohexane and epoxidized dimer of cyclopentadiene.

Phenolic and Thiophenolic Reactants:

The phenolic and thiophenolic reactants are organic compounds having one or more hydroxyl or thiol groups attached to an aromatic carboxylic nucleus. This class of compounds therefore includes thiophenol, phenol, alpha and beta naphthol, o-, m-, or p-chlorophenol, alkylated derivatives of phenol (e.g., o-methyl-, 3,5-dimethyl-, p-t-butyl- and p-nonylphenyl) and other monohydric phenols as well as polyhydric phenols, such as resorcinol, hydroquinone, dithiophenol, p,p'-dimercaptophenyl ether, p-hydroxythiophenol, etc.

The polyhydric phenols bearing from 2 to 6 hydroxyl groups and having from 6 to about 30 carbon atoms are particularly useful as reactants in the reaction with epoxy resins to form high molecular weight resins. Representative of these preferred phenols are 2,4',4''-tri(hydroxyphenyl)methane, phenolphthalein and the like. Particularly preferred as phenol reactants are those compounds corresponding to formula VIII. The most preferred phenols are bisphenol A, bisphenol F, 2,2',6,6'-tetrachlorobisphenol A, 2,2',6,6'-tetrabromobisphenol A, bisphenol S and 4,4'-dihydroxybiphenyl.

Process for Reacting Epoxide and Phenol:

Certain reaction conditions employed in the subject process are critical if substantial deactivation of the phosphonium catalyst and the formation of deleterious by-products is to be avoided. This is particularly true of those catalysts in which at least one R in the compound corresponding to formulae I, II or III is phenyl, as these catalysts are particularly sensitive to decomposition.

The reaction medium must be maintained essentially anhydrous while at reactive conditions. Deleterious reactions have been observed with less than 0.009 weight percent water present in the reaction medium. No threshold level of water has been determined below which deleterious reactions are not observed. It has been found that water at the level normally observed in reactants and catalysts is sufficient to totally inactivate many phosphonium catalysts during the advancement of an epoxy resin. Accordingly, extreme care must be taken to ensure the reaction medium is essentially anhydrous. In preferred embodiments of this invention, it has been found that the advanced reaction product will contain 20 percent more phosphonium cation than the product of an otherwise similar reaction where the reaction medium contains 0.01 percent water based on the reactants and the reaction temperature reaches a maximum of at least 180° C.

The preferred method of removing essentially all water from the reaction medium is to conduct the advancement reaction under vacuum. Pressures of less than 10 millimeters (mm) of Hg, more preferably less than 1 mm of Hg, have been found advantageous. If the reactants are unusually "wet" or the catalyst unusually sensitive to water, it is prudent to prepare the reactants and catalysts so as to minimize the water present and to dehydrate the reactants and catalysts as much as possible before conducting the advancement reaction. For example, tetrahydrocarbyl phosphonium carboxylate catalysts can be prepared by reaction of an acid anhydride with a corresponding phosphonium hydroxide to prepare an anhydrous catalyst, whereas reaction of a carboxylic acid and phosphonium hydroxide produces water along with the catalyst. Alternatively, a dehydrating reagent can be employed to eliminate water from the reaction medium prior to or during advancement. This dehydrating reagent should be essentially inert to the catalyst, reactants and product, but must show is sufficient affinity for water to render the reaction medium essentially anhydrous.

The reaction temperature must be carefully controlled to maintain a reaction and exotherm temperature less than about 170° C. Inasmuch as the advancement reaction is generally exothermic, appropriate precautions must be taken to control the reaction temperature by techniques known in the art. These techniques include the use of diluents, initiating reaction at a temperature substantially below 170° C., agitation of the reaction medium, other provisions for good heat transfer and metering reactants into the reaction zone slowly. At temperatures below about 100° C. the advancement reaction is generally uneconomically slow. Preferably, the advancement reaction is conducted at temperatures in the range from about 120° to about 170° C.

The ratio of the epoxide to the phenol reactants employed in the process may vary over a wide range depending upon the type of reactants and the type of product desired. For example, if a product terminated with a phenolic ether group is desired, one would employ an excess of the phenol in the process. Generally, a small excess of epoxide or stoichiometric quantities of both reactants are preferred.

The amount of the phosphonium catalyst employed in the process of this invention can vary over a wide range, so long as a catalytic amount is present. In general, the catalyst is added in amounts of from about 0.001 percent to about 10 percent by weight of the reactants. The subject process is particularly advantageous where at least 0.5 weight percent catalyst is employed based on the reactants present. It is at these higher loadings that undesirable reactions with the catalyst can most significantly degrade the properties and purity of the resin produced.

The reaction may be conducted in the presence or absence of solvents or diluents, but is conveniently conducted in a liquid phase. In most cases, the reactants will be liquid or low melting solids and the reaction may be at least initially easily effected without the addition of solvents or diluents. As the advancement reaction proceeds and the average molecular weight of the product increases, the reaction mixture becomes progressively more viscous or may solidify. To maintain efficient blending of the reaction mixture, it may be necessary to add diluents, increase the temperature of the reaction mixture to the fusion point of the reactants or to utilize very efficient blending means. Suitable diluents are those organic compounds which are inert to the reactants and in the liquid phase at the reaction temperature, for example, ethylene glycol ethyl ether, xylene, toluene, cyclohexane and the like. The diluent is substantially free of water and is desirably substantially free of impurities which will decrease the activity of the catalyst, such as peroxides, hydroperoxides or uncomplexed transition metal ions.

The progress of the advancement reaction can be conveniently monitored by removing samples and analyzing by conventional techniques the phenolic hydroxyl and epoxy moieties present. When the quantities of these moieties approach their theoretical values and no further change is detected, the reaction is complete.

In those preferred embodiments of the invention in which the phosphonium cation of the catalyst bears at least one alkyl group and one aryl group, it is believed that a phosphonium ylid is a transient intermediate for decomposition pathways of the catalyst. Phosphonium ylids and their chemistry are well documented in the art. See, e.g., A. W. Johnson, *Ylid Chemistry*, Academic Press (1966). It has been found that after the advancement reaction has proceeded to the desired degree, if a compound is introduced which selectively reacts with the phosphonium ylid but not the epoxy resin product, the catalyst can be deactivated without substantial deleterious reaction with the desired product. Such reactants are known in the prior art and include water, aldehydes, ketones, sulfoxides, sulfones, carboxylic acid esters, cyclic alkylene carbonates, sulfides, lactones, isocyanates, nitrites, isothiocyanates, peroxides and activated epoxides. Water is the preferred phosphonium ylid "quenching" reagent. Generally, a stoichiometric quantity of this reagent based on the phosphonium cation concentration is employed in order to avoid possible undesirable reactions with the advanced epoxy resin or post-reaction additives. In order to completely deactivate the phosphonium catalyst it is generally desirable to maintain the epoxy resin at a temperature of from about 100° to about 160° C. for 0.5 to 2.0 hours after addition of the phosphonium ylid quenching reagent. The deactivation of the catalyst to tertiary phosphine oxides can be monitored by phosphorus-31 nuclear magnetic resonance spectroscopy or by other means known in the art.

Advancement Reaction Products:

The advanced epoxy resin produced in the instant process will contain a catalytically-active phosphonium cation, unless the catalyst is deactivated in a post addition reaction. The reduced level of catalyst decomposition products relative to prior art products results in a resin which has superior color, is more linear and has close to the theoretical epoxide content. These advantages are particularly apparent in resins advanced to a molecular weight of at least 50,000 grams per mole as determined by gel permeation chromatography. Furthermore, the catalyst present can be used to react the advanced resin with additional bisphenol or bisthiophenol, to promote curing with anhydrides or amines or other reactions. In some preferred embodiments of this invention, the presence of active phosphonium catalyst in the advanced resin reduces the gel time of the resin in the presence of a conventional curing reagent by at least about 50 percent.

The catalyst present with this advanced epoxy resin can also be deactivated as described hereinbefore, where the phosphonium cation bears at least one aryl and one alkyl substituent. The resulting resin containing deactivated catalyst has fewer epoxide moieties which have reacted with catalyst derivatives than the prior art resins. These epoxy resin products have superior color and epoxy equivalent weight closer to theoretical, but have utilities similar to prior art resins.

The control of the equivalent ratio of the polyepoxides and polyhydric phenols during the advancement reaction permits the preparation of a variety of products. Those products which use an excess of the polyepoxide in their preparation will be terminated in epoxy groups and can be used as polyepoxides in known reactions of polyepoxides with curing agents and the like. The high molecular weight polyepoxides are particularly useful in preparing surface coatings, adhesives, laminates, filament windings, coatings for highways and airfields, structural applications, formation of foams and the like. Those prepared from the halogenated polyhydric phenols as shown hereinafter are particularly useful as flame-proofing resins for forming laminates, coatings and the like. The ultra-high molecular weight product terminated with a phenolic ether group approaches an engineering thermoplastic, like polycarbonate, in some of its properties and is particularly suited to such uses as an automotive undercoating, films or molded articles.

The reaction products terminated in epoxy groups can also be used to prepare vinyl ester resins. Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from unsaturated monocarboxylic acids such as acrylic and methacrylic acid. Vinyl ester resins based on epoxy novolac resins are described in U.S. Pat. No. 3,301,743 to Fekete et al. Fekete et al also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid. All of the abovedescribed resins, which contain the characteristic linkages

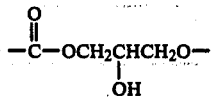

and terminal, polymerizable vinylidene groups, are classified as vinyl ester resins and are incorporated herein by reference.

The following examples are illustrative of the present invention and are not to be construed as limiting the scope thereof in any manner. All parts and percentages are by weight unless otherwise specified.

EXAMPLES 1-12-COMPARATIVE EXPERIMENTS A AND B

To a 250 milliliter Parr reactor equipped with a stirrer, means for measuring temperature, means for controlling temperature and suitable outlets and inlets was charged at ambient temperature p,p'-bisphenol A and the diglycidyl ether of bisphenol A. These reactants were introduced in a ratio which would give the theoretical epoxide content for the final product indicated in Table I. To this viscous mixture was introduced the tabulated quantity (in weight percent of reactants) of the essentially anhydrous tetrahydrocarbyl phosphonium salt indicated in Table I dissolved in a small amount of anhydrous methanol. The stirred reaction mixture was heated at a rate of from 1° to 5° C. per minute. When the temperature of about 40° C. was reached, a vacuum (less than 1.0 mm of Hg) was applied to remove all volatiles. Heating continued to a temperature of about 150° C., at which time cooling was applied as necessary to prevent the reaction mixture from exceeding an exotherm temperature of about 175° C. In some comparative experiments, a greater temperature was reached. The temperature of the reaction mixture was maintained above about 160° C. until no further reaction of the mixture was detected; this typically required from 1 to 2 hours.

The hot, viscous product was removed from the reaction vessel and rapidly cooled to 20° C. The product was analyzed by phosphorus-31 nuclear magnetic resonance spectroscopy to ascertain the percentage phosphorus (on an area percent basis) present as a phosphonium cation or tertiary phosphine oxides. The analysis results are compiled in Table I.

TABLE I

| Ex. | $R_4P^+X^\ominus$ (% of Reactants) | Peak Exotherm (°C.) | % Phosphorous - After Reaction | | % Epoxide | |
|---|---|---|---|---|---|---|
| | | | as Cation | as Phosphine Oxide | Observed | Theoretical |
| 1 | $(Phenyl)_3$-$P^\oplus$—$C_2H_5$ $CH_3CO_2^\ominus.CH_3CO_2H$ (0.3) | 170 | 69.4 | 30.6 | 7.3 | 8.0 |
| 2 | $(Phenyl)_3$-$P^\oplus$—$C_2H_5$ $CH_3CO_2^\ominus.CH_3CO_2H$ (0.05) | 165 | 93.0 | 7.0 | 7.9 | 8.0 |
| A* | $(Phenyl)_3$-$P^\oplus$—$C_2H_5$ $CH_3CO_2^\ominus.CH_3CO_2H$ (0.3) | 185 | 34.7 | 65.3 | 7.2 | 8.0 |
| 3 | $(Phenyl)_3$-$P^\oplus$—$C_2H_5$ $HCO_3^\ominus$ (0.05) | 160 | 98.0 | 2.0 | 4.0 | 4.0 |
| 4 | $(Phenyl)_3$-$P^\oplus$—$C_2H_5$ $HCO_3^\ominus$ (5.0) | 170 | 90.0 | 10.0 | 0.4 | 0.0 |
| 5 | $(Phenyl)_3$-$P^\oplus$—$C_2H_5$ $I^\ominus$ (0.3) | 170 | 94.0 | 6.0 | 2.1 | 2.0 |
| B* | $(Phenyl)_3$-$P^\oplus$—$C_2H_5$ | 185 | 59.3 | 40.7 | 7.6 | 8.0 |

TABLE I-continued

| Ex. | $R_4P^+X^\ominus$ (% of Reactants) | Peak Exotherm (°C.) | % Phosphorous - After Reaction as Cation | as Phosphine Oxide | % Epoxide Observed | Theoretical |
|---|---|---|---|---|---|---|
| | $I^\ominus$ (1.33) | | | | | |
| 6 | $(Phenyl)_3\text{-}P^\oplus\text{—}C_2H_5$ $CF_2CO_2^\ominus$ (0.3) | 170 | 66.4 | 33.6 | 8.0** | 6.5 |
| 7 | $Phenyl\text{-}CH_2\text{—}P^\oplus(\text{-}n\text{-}C_4H_9)_3$ $Br^\ominus$ (0.3) | 173 | 64.0 | 36.0 | 8.0 | 8.0 |
| 8 | $(Phenyl)_3\text{-}P^\oplus\text{—}CH_3Br^\ominus$ (0.3) | 175 | 100.0 | 0.0 | 2.2 | 2.0 |
| 9 | $(Phenyl)_4\text{-}P^\oplus Br^\ominus$ (0.4) | 170 | 96.0 | 4.0 | 8.0 | 7.8 |
| 10 | $(Phenyl)_3\text{-}P^\oplus\text{—}C_2H_4\text{—}P^\oplus(\text{-}Phenyl)_3$ $2Br^\ominus$ (0.3) | 165 | 80.7 | 19.3 | 8.0 | 8.0 |
| 11 | $(Phenyl)_3\text{-}P^\oplus(\text{-}CH_2\text{-})_{15}CH_3$ $Br^\ominus$ (0.4) | 175 | 90.1 | 9.9 | 4.0 | 3.8 |
| 12 | 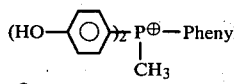 $I^\ominus$ (0.4) | 170 | 96.3 | 3.7 | 8.0 | 7.8 |

*Comparative Experiments. Not an embodiment of this invention.
**Branched epoxy resin of very low color.

With some of the catalysts it was not possible to remove all of the intrinsic water. For example, all water could not be removed from the catalyst used in Examples 1 and 2 by treatment with activated molecular sieves or by drying in a vacuum oven at 100° C. and a pressure of 0.1 mm of Hg. As a result, most of the phosphine oxide formed was the ethyl diphenylphosphine oxide in Example 1. In other cases, Comparative Experiment B for instance, virtually all water could be removed but at high temperatures formation of triphenylphosphine oxide occurred as a consequence of reaction with epoxide groups.

The data in Table I indicates that by careful temperature control and maintenance of anhydrous conditions the phosphonium catalyst is not severely deactivated during the advancement of an epoxy resin. The resulting resin is frequently superior in color and other chemical and physical properties when compared with prior art resins.

EXAMPLES 13-15

Advanced resins like those produced in Examples 1, 8 and 11, with the exception of the epoxide content, were reacted with bisphenol-A (Examples 13 and 15) or p,p'-dimercaptophenyl ether (Example 14) at 160° C. for one hour at a pressure of 0.7 mm of Hg. No additional phosphonium catalyst was added to the 0.3 weight percent present when advancement was begun. The results of these reactions are tabulated in Table II.

TABLE II

| Ex. | $R_4P^\oplus$ Cation | Initial Epoxide | Epoxide in Product % Observed | Theoretical % |
|---|---|---|---|---|
| 13 | $(Phenyl)_3\text{-}P^\oplus\text{—}C_2H_5$ | 8.0% | 2.15 | 2.0 |
| 14 | $(Phenyl)_3\text{-}P^\oplus\text{—}CH_3$ | 6.0% | 0.31 | 0.0 |
| 15 | $(Phenyl)_3\text{-}P^\oplus\text{—}(CH_2\text{-})_{15}CH_3$ | 3.0% | 0.0 | 0.0* |

*75 mole percent excess of bisphenol A was employed.

Examples 13-15 confirm the utility of the active catalyst in subsequent reactions.

EXAMPLES 16-33

In order to demonstrate the efficacy of phosphonium ylid quenching reagents in deactivating certain phosphonium catalysts, advanced epoxy resins were prepared with a variety of catalysts at anhydrous conditions at peak temperatures of no greater than 170° C. in the general manner of Examples 1-12. In some of these examples water, benzaldehyde or cyclohexanone was added and the advanced resin maintained at a temperature of 100°-160° C. for 0.5 to 2.0 hours. The product was then analyzed by phosphorus-31 nuclear magnetic resonance spectroscopy. The reaction parameters and results are tabulated in Table III.

TABLE III

| Ex. | $R_4P^\oplus X^\ominus$ (wt. %) | Quenching Agent (Wt. %) | % Phosphorus-After Reaction As Cation | as Phosphine Oxide | % Epoxide Observed | Theoretical |
|---|---|---|---|---|---|---|
| 16 | $(Phenyl)_3\text{-}P^\oplus\text{—}C_2H_5\ I^\ominus$ (0.75) | None | 97.3 | 2.7 | 7.9 | 8.0 |
| 17 | $(Phenyl)_3\text{-}P^\oplus\text{—}C_2H_5\ I^\ominus$ (0.75) | $H_2O$ (5.0) | 3.7 | 96.3 | 7.8 | 8.0 |
| 18 | $(Phenyl)_3\text{-}P^\oplus\text{—}C_2H_5\ I^\ominus$ (2.5) | $H_2O$ (5.0) | 5.1 | 94.9 | 1.8 | 2.0 |
| 19 | $(Phenyl)_3\text{-}P^\oplus\text{—}C_2H_5\ I^\ominus$ (0.75) | Benzaldehyde (5.0) | 0.0 | 100.0 | 7.7 | 8.0 |
| 20 | $(Phenyl)_3\text{-}P^\oplus\text{—}C_2H_5\ I^\ominus$ (0.25) | Cyclohexane (5.0) | 16.3 | 83.7 | 8.0 | 8.0 |

TABLE III-continued

| Ex. | R₄P⊕X⊖ (wt. %) | Quenching Agent (Wt. %) | % Phosphorus-After Reaction As Cation | as Phosphine Oxide | % Epoxide Observed | Theoretical |
|---|---|---|---|---|---|---|
| 21 | (Phenyl)₃-P⊕—CH₃ Br⊖ (0.45) | None | 90.7 | 9.3 | 4.1 | 4.0 |
| 22 | (Phenyl)₃-P⊕—C₂H₅ Br⊖ (0.45) | H₂ (5.0) | 0.0 | 100.0 | 3.9 | 4.0 |
| 23 | (Phenyl)₃-P⊕—C₂H₅ HCO₃⊖ (0.3) | None | 89.7 | 10.3 | 4.0 | 4.0 |
| 24 | (Phenyl)₃-P⊕—C₂H₅ HCO₃⊖ (0.3) | H₂O (3.0) | 3.4 | 96.6 | 3.9 | 4.0 |
| 25 | (Phenyl)₃-P⊕—C₂H₅ 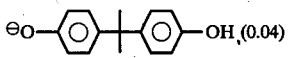 ⊖O—⌬—⌬—OH (0.04) | None | 96.1 | 3.9 | 4.0 | 4.0 |
| 26 | (Phenyl)₃-P⊕—C₂H₅ 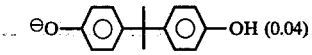 ⊖O—⌬—⌬—OH (0.04) | H₂O (5.0) | 1.1 | 98.9 | 3.8 | 4.0 |
| 27 | (Phenyl)₃-P⊕—CH₃ H₂PO₄⊖·H₃PO₄ (0.8) | None | 83.4 | 16.6 | 3.9 | 4.0 |
| 28 | (Phenyl)₃-P⊕—CH₃ H₂PO₄⊖·H₃PO₄ (0.8) | H₂O (5.0) | 0.0 | 100.0 | 3.8 | 4.0 |
| 29 | 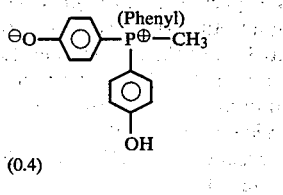 ⊖O—⌬—P⊕(Phenyl)—CH₃ with —⌬—OH (0.4) | None | 94.6 | 5.4 | 6.2 | 6.0 |
| 30 | 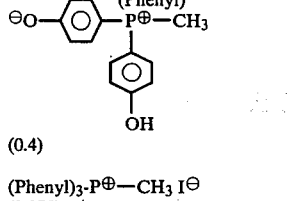 ⊖O—⌬—P⊕(Phenyl)—CH₃ with —⌬—OH (0.4) | H₂O (5.0) | 15.3 | 84.7 | 5.8 | 6.0 |
| 31 | (Phenyl)₃-P⊕—CH₃ I⊖ (0.075) | None | 93.1 | 6.9 | 3.9 | 4.0 |
| 32 | (Phenyl)₃-P⊕—CH₃ I⊖ (0.075) | H₂O (1.0) | 0.0 | 100.0 | 4.0 | 4.0 |
| 33 | (Phenyl)₃-P⊕—CH₃ I⊖ (3.0) | H₂O (5.0) | 0.0 | 100.0 | 1.9 | 2.0 |

The catalyst used in Examples 29 and 30 was prepared by the reaction of phenylphosphinodiphenol with methyl iodide in diethyl ether for 8 hours at 20° C., followed by the addition of excess aqueous NaOH and cooling to precipitate the product. The phosphinophenol reactant can be prepared in accordance with the procedure described in Senear et al, *Journal of Organic Chemistry*, 25, 2001 (1960). This catalyst is particularly interesting because it is believed to polymerize into the advanced epoxy resin through the pendant hydroxyl functionalities. The other catalysts described are prepared by more conventional methods.

Comparative Experiments C-U

A bisphenol A and a diglycidyl ether of bisphenol A (DGEBA) were reacted in the presence of several different phosphonium catalysts in a manner similar to reactions conducted in the prior art. A nitrogen sweep gas at atmospheric pressure was employed and when the reaction temperature reached 150° C. heating was discontinued but no other effort to control the reaction exotherm temperature was employed. Heating was continued after the reaction medium had cooled from its exotherm maximum to 160° C. A temperature of 160° C. was maintained for three hours, at which time the product was analyzed to determine the epoxide content and nature of the phosphorus compounds present. The results and reaction parameters are compiled in Table IV.

TABLE IV

| Comp. Exp. | R₄P⊕ | X⊖ | Wt. % Catalyst | Peak Temp. (°C.) | % Phosphorus* As Cation | As Phosphine Oxide | % Epoxide Observed | Theoretical |
|---|---|---|---|---|---|---|---|---|
| C | (Phenyl)₃-P⊕—C₂H₅ | F⊖ | 1.33 | 211 | 0.0 | 100.0 | 6.9 | 8.0 |

TABLE IV-continued

| Comp. Exp. | R$_4$P$^\oplus$ | X$^\ominus$ | Wt. % Catalyst | Peak Temp. (°C.) | % Phosphorus* As Cation | % Phosphorus* As Phosphine Oxide | % Epoxide Observed | % Epoxide Theoretical |
|---|---|---|---|---|---|---|---|---|
| D | " | Cl$^\ominus$ | 1.33 | 177 | 0.0 | 100.0 | 6.7 | 8.0 |
| E | " | Br$^\ominus$ | 1.33 | 188 | 5.0 | 95.0 | 6.8 | 8.0 |
| F | " | I$^\ominus$ | 1.33 | 184 | 4.0 | 96.0 | 6.7 | 8.0 |
| G | " | " | 0.2 | 185 | 0.0 | 100.0 | 8.1 | 8.0 |
| H | " | " | 2.0 | 245 | 0.0 | 100.0 | 1.4 | 2.0 |
| J | " | " | 0.04 | 180 | 0.0 | 100.0 | 4.1 | 4.0 |
| K | " | HCO$_2^\ominus$ | 1.33 | 180 | 0.0 | 100.0 | 7.4 | 8.0 |
| L | " | HCO$_3^\ominus$ | 1.33 | 187 | 0.0 | 100.0 | 7.3 | 8.0 |
| M | " | H$_3$CCO$_2^\ominus$ | 1.33 | 194 | 0.0 | 100.0 | 8.0 | 8.0 |
| N | " | F$_3$CCO$_2^\ominus$ | 1.33 | 206 | 0.0 | 100.0 | 6.1 | 8.0 |
| O | " | H$_3$CCO$_2^\ominus$·H$_3$CCO$_2$H | 1.33 | 182 | 0.0 | 100.0 | 7.8 | 8.0 |
| P | " | " | 0.2 | 200 | 0.0 | 100.0 | 7.8 | 8.0 |
| Q | " | " | 0.4 | 225 | 0.0 | 100.0 | 2.1 | 2.0 |
| R | (Phenyl)$_3$-P$^\oplus$—CH$_3$ | I$^\ominus$ | 1.33 | 211 | 0.0 | 100.0 | 7.1 | 8.0 |
| S | " | Br$^\ominus$ | 1.33 | 173 | 0.0 | 100.0 | 7.4 | 8.0 |
| T | (Phenyl)$_3$-P$^\oplus$(-n-C$_4$H$_9$) | Br$^\ominus$ | 1.33 | 181 | 29.0 | 71.0 | 6.8 | 8.0 |
| U | (Phenyl)$_3$-P$^\oplus$-(CH$_2$)$_{15}$CH$_3$ | Br$^\ominus$ | 1.33 | 187 | 12.0 | 88.0 | 7.1 | 8.0 |

*Post Reaction

Comparative Experiments V-Y

An epoxy resin advancement reaction was conducted in a manner similar to Comparative Experiment C except that a sealed bomb (Parr) reactor was employed and no sweep gas was used. The intrinsic water content of the bisphenol A was 0.0026 percent and of the DGEBA was 0.0067 percent. The catalyst employed, the water in the catalyst as a weight percent of the reactants and other reaction parameters and results are tabulated in Table V.

EXAMPLES 34-36, COMPARATIVE EXPERIMENTS Z, AA

Advanced epoxy resins prepared in the general manner of Example 1 using an ethyltriphenylphosphonium salt were stored for 6 to 12 months at a temperature of 25° C. Before and after storage, the resins were analyzed for percent epoxide and percent of phosphorus-containing compounds via conventional techniques. No change in content of percent epoxide or phosphorus-containing compounds was observed.

TABLE V

| Comp. Exp. | R$_4$P$^\oplus$X$^\ominus$ (Wt. %) | Wt. % H$_2$O in R$_4$P$^\oplus$X$^\ominus$ | Peak Temp. (°C.) | % Phosphorus* As Cation | % Phosphorus* As Phosphine Oxide | % Epoxide Observed | % Epoxide Theoretical |
|---|---|---|---|---|---|---|---|
| V | (Phenyl)$_3$-P$^\oplus$—C$_2$H$_5$ CH$_3$CO$_2^\ominus$·CH$_3$CO$_2$H (0.25) | 0.016 | 200 | 0.0 | 100.0 | 7.8 | 8.0 |
| W | (Phenyl)$_3$-P$^\oplus$—C$_2$H$_5$ I$^\ominus$ (0.3) | 0.002 | 194 | 4.0 | 96.0 | 7.9 | 8.0 |
| X | (n-C$_4$H$_9$)$_4$P$^\oplus$ CH$_3$CO$_2^\ominus$·CH$_3$CO$_2$H (0.3) | 0.018 | 180 | 100.0 | 0.0 | 6.4 | 8.0 |
| Y | (Phenyl)$_4$-P$^\oplus$ Br$^\ominus$ (0.4) | — | 191 | 41.0 | 59.0 | 7.7 | 8.0 |

*Post Reaction

Comparative Experiment X indicates that a tetraalkylphosphonium salt is less sensitive to the presence of water and temperatures above 175° C. than are phosphonium salts bearing one or more aryl groups. However, the subject process has been found to prepare superior products even with tetraalkylphosphonium catalysts.

A portion of each of these resins was cured at 175° C. using either dicyanodiamide (DICY) or tetrahydrophthalic anhydride (THPA) in an amount which would be theoretically predicted to react with 75 percent of the epoxide groups of the resin. Also cured in the same manner was an epoxy resin containing 1 weight percent ethyldiphenyl phosphine oxide. The elapsed time in seconds required for each resin to gel is tabulated in Table VI along with other pertinent parameters.

TABLE VI

| Ex. | Comp. Exp. | Wt. % C$_2$H$_5$—P$^\oplus$(Phenyl)$_3$ | Wt. % $\overset{O}{\underset{\|}{C_2H_5P}}$(Phenyl)$_2$ | % Epoxide Before Cure | Gel Time DICY | Gel Time THPA |
|---|---|---|---|---|---|---|
| 34 | — | 0.14 | — | 7.0 | .671 | 1393 |
| 35 | — | 0.45 | — | 6.1 | 411 | 622 |
| 36 | — | 0.25 | — | 6.4 | 406 | — |
| — | Z | — | 1.0 | 7.6 | 703 | >2000 |
| — | AA | 0.0 | 0.0 | 8.0 | 703 | >2000 |

It is apparent from the gel times reported in Table II that the presence of active phosphonium catalyst can accelerate the curing of an epoxy resin advanced with the same catalyst. It has been observed that the accelerated cure is most noticeable where at least 0.1 percent phosphonium catalyst is present.

What is claimed is:

1. In a process for preparing an advanced epoxy resin by reacting
   (a) a compound bearing an average of more than one vicinal epoxide group per molecule with
   (b) a polyhydric phenol or thiophenol, in the presence of a catalytic amount of a tetrahydrocarbyl phosphonium salt,
the improvement wherein the reaction is conducted at a temperature less than about 175° C. and in an essentially anhydrous medium.

2. The process as described in claim 1, wherein at least about 50 percent of the tetrahydrocarbyl phosphonium cation salt employed as a catalyst is present as a phosphonium salt at the conclusion of the advancement reaction.

3. The process as described in claim 1 which further comprises the curing of the advanced resin with a conventional amine or anhydride curing reagent.

4. The process as described in claim 1 wherein the epoxy resin produced contains at least 20 percent more of the tetrahydrocarbyl phosphonium cation than in a similar advancement reaction where 0.01 weight percent water based on the reactants is present in the reaction medium and the maximum reaction or exotherm temperature is at least 180° C.

5. The process as described in claim 1 wherein the tetrahydrocarbyl phosphonium salt corresponds to the formulae I, II, III or IV

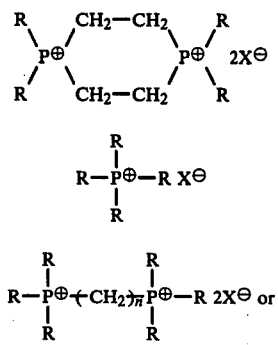

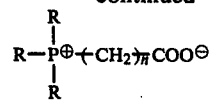

wherein R at each occurrence is independently a hydrocarbyl or inertly substituted hydrocarbyl group, n is an integer from 1 to 20 and X is a compatible anion.

6. The process as described in claim 5 wherein at least one R borne by each phosphonium cation is an aryl moiety.

7. The process as described in claim 6 wherein one R is alkyl and the other R groups are aryl moieties for each phosphonium cation.

8. The process as described in claim 5 wherein the phosphonium salt corresponds to formula II.

9. The process as described in claim 8, wherein $X^{\ominus}$ is a halide, carboxylate, bicarbonate, biphosphate tetrafluoroborate, phenate or bisphenate.

10. The process as described in claim 9 wherein three of the R groups are phenyl and one is a $C_1$–$C_4$ alkyl.

11. The process as described in claim 1 wherein the phosphonium salt is a phosphonium hydroxide inner salt.

12. The process as described in claim 6 further comprising the step of adding a sufficient quantity of a phosphonium ylid quenching reagent to selectively deactivate the tetrahydrocarbyl phosphonium catalyst without substantial reaction with the advanced epoxy resin.

13. The process as described in claim 12 wherein the phosphonium ylid quenching agent is water.

14. The process as described in claim 12 wherein the phosphonium ylid quenching agent is an aldehyde or ketone.

15. The advanced epoxy resin containing a tetrahydrocarbyl phosphonium salt produced as described in claim 2.

16. The advanced epoxy resin containing active phosphonium cations produced as described in claim 7.

17. The advanced epoxy resin containing active phosphonium cations produced as described in claim 10.

18. The advanced epoxy resin and deactivated catalyst produced as described in claim 12.

19. The advanced epoxy resin and deactivated catalyst produced as described in claim 13.

20. The advanced epoxy resin and deactivated catalyst as described in claim 19 wherein the phosphonium catalyst used to advance the resin corresponds to formula II where three R groups are phenyl and one is a $C_1$–$C_4$ alkyl.